United States Patent
Sa et al.

(10) Patent No.: US 8,704,928 B2
(45) Date of Patent: Apr. 22, 2014

(54) PIXEL, PIXEL ARRAY, IMAGE SENSOR INCLUDING THE SAME AND METHOD FOR OPERATING THE IMAGE SENSOR

(75) Inventors: Seung Hoon Sa, Seoul (KR); Woon Il Choi, Seoul (KR); Seong Hyung Park, Seoul (KR); Chun Hee Jeong, Seoul (KR); Dong Hyuk Park, Seoul (KR); Cheong Yong Park, Seoul (KR); Jung Chan Kyoung, Seoul (KR); Jung Wan Jeong, Seoul (KR); Dong Gyu Lee, Seoul (KR); Jong Min You, Seoul (KR); Hyun Jong Ji, Seoul (KR)

(73) Assignee: LG Innotek Co., Ltd., Seoul (KR)

( * ) Notice: Subject to any disclaimer, the term of this patent is extended or adjusted under 35 U.S.C. 154(b) by 259 days.

(21) Appl. No.: 13/097,681

(22) Filed: Apr. 29, 2011

(65) Prior Publication Data

US 2012/0257092 A1    Oct. 11, 2012

(30) Foreign Application Priority Data

Apr. 11, 2011   (KR) .................. 10-2011-0033465

(51) Int. Cl.
    *H04N 5/335*    (2011.01)
(52) U.S. Cl.
    USPC .................. 348/308; 348/229.1; 348/297
(58) Field of Classification Search
    USPC ......................... 348/308, 294–297
    See application file for complete search history.

(56) References Cited

U.S. PATENT DOCUMENTS

| | | | |
|---|---|---|---|
| 2009/0096901 A1 | 4/2009 | Bae et al. | |
| 2010/0277622 A1 | 11/2010 | Fossum et al. | |
| 2011/0013066 A1* | 1/2011 | Boemler | 348/308 |
| 2011/0249162 A1* | 10/2011 | Moore | 348/308 |
| 2013/0088620 A1* | 4/2013 | Centen et al. | 348/273 |

FOREIGN PATENT DOCUMENTS

| | | |
|---|---|---|
| JP | 2008-099040 A | 4/2008 |
| KR | 10-0847742 B1 | 7/2008 |
| KR | 10-0853195 B1 | 8/2008 |
| KR | 10-2010-0118772 A | 11/2010 |

OTHER PUBLICATIONS

Notice of Allowance dated Jun. 18, 2013 in Korean Application No. 10-2011-0033465, filed Apr. 11, 2011.

* cited by examiner

*Primary Examiner* — Tuan Ho
(74) *Attorney, Agent, or Firm* — Saliwanchik, Lloyd & Eisenschenk

(57) ABSTRACT

Disclosed are a pixel, a pixel array, an image sensor including the pixel array and a method for operating the image sensor. The pixel includes a photo-electro conversion unit; a capacitor for storing charges converted by the photo-electro conversion unit; an output switching device for outputting an electric potential of the capacitor; and a removal unit for removing a part of the charges converted by the photo-electro conversion unit.

11 Claims, 4 Drawing Sheets

PIXEL, PIXEL ARRAY, IMAGE SENSOR INCLUDING THE SAME AND METHOD FOR OPERATING THE IMAGE SENSOR

CROSS-REFERENCE TO RELATED APPLICATION

This application claims the benefit under 35 U.S.C. §119 of Korean Patent Application No. 10-2011-0033465, filed on Apr. 11, 2011, which is hereby incorporated by reference in its entirety.

BACKGROUND

The embodiment relates to a pixel, a pixel array, an image sensor including the same and a method for operating the image sensor.

A dynamic range is one of important factors to determine the quality of an image sensor. In general, the dynamic range refers to the maximum range for processing signals without distorting input signals. In the case of the image sensor, images having the superior quality can be obtained as the dynamic range becomes widened regardless of the brightness variation.

However, according to the color image sensor of the related art, the dynamic range is so narrow that the original color of the image may not be expressed well when one of red, green and blue colors is saturated. In order to solve the problem caused by the narrow dynamic range, a WDR (wide dynamic range) pixel has been suggested.

First, there has been suggested a method of realizing the WDR operation by adjusting irradiation time of the light in the image sensor of the related art.

Second, there has been suggested a method of providing an additional capacitor to change FD (floating diffusion) capacity, in which a pixel structure includes a transistor to adjust the additional capacitor so that overflow charges, which are generated from a PD (photodiode) under the high intensity of illumination as light intensity is increased, can be stored in the additional capacitor.

Third, there has been suggested a method of providing a WDR pixel, in which two PDs are installed in one pixel such that charges generated from the two PDs are combined with each other.

However, according to the first method, the sensitivity is constant regardless of the variation of light intensity (that is, high intensity of illumination and low intensity of illumination), so that the image may be darkened under the low intensity of illumination. In addition, while the pixel is being operated, the timing adjustment for the pixel operation under the high intensity of illumination may be limited.

Further, in the case of the second method for improving the sensitivity according to the light intensity by using the additional capacitor and the transistor and the third method for driving two PDs installed in one pixel, the fill factor in the pixel may be reduced.

BRIEF SUMMARY

The embodiment provides a pixel capable of improving the sensitivity while maintaining the high fill factor, a pixel array, an image sensor including the same and a method for operating the image sensor.

A pixel according to the embodiment may include a photo-electro conversion unit; a capacitor for storing charges converted by the photo-electro conversion unit; an output switching device for outputting an electric potential of the capacitor; and a removal unit for removing a part of the charges converted by the photo-electro conversion unit.

A pixel according to the embodiment may include a first photo-electro conversion unit; a second photo-electro conversion unit; a capacitor for storing charges converted by the first and second photo-electro conversion units; an output switching device connected to a power supply line to output an electric potential of the capacitor; a first removal unit for discharging a part of the charges converted by the first photo-electro conversion unit to the power supply line; and a second removal unit for discharging a part of the charges converted by the second photo-electro conversion unit to the power supply line.

A pixel array according to the embodiment may include the pixel.

An image sensor according to the embodiment may include the pixel array.

According to the embodiment, a method for operating an image sensor is provided, in which the image sensor includes a photo-electro conversion unit, a capacitor for storing charges converted by the photo-electro conversion unit, and an output switching device for outputting an electric potential of the capacitor, and the method includes the step of discharging a part of the charges converted by the photo-electro conversion unit to a power supply line according to an exposure time to a light by using a removal unit used to remove a part of the charges converted by the photo-electro conversion unit.

The embodiment can provide a pixel capable of improving the sensitivity while maintaining the high fill factor, a pixel array, an image sensor including the same and a method for operating the image sensor.

According to the embodiment, a charge removal unit, such as a removal transistor Tr, which is a removal switching device operated independently from a 4-Tr structure used as a pixel structure for realizing the WDR, is added to the 4-Tr structure in order to adjust the quantity of charges generated from a photo-electro conversion unit, such as a photodiode (PD), according to the intensity variation of the light, and a gate voltage of the removal transistor Tr is freely adjusted so that the high fill factor can be maintained without using an additional memory block for combining the images.

DETAILED DESCRIPTION

Figure 1:
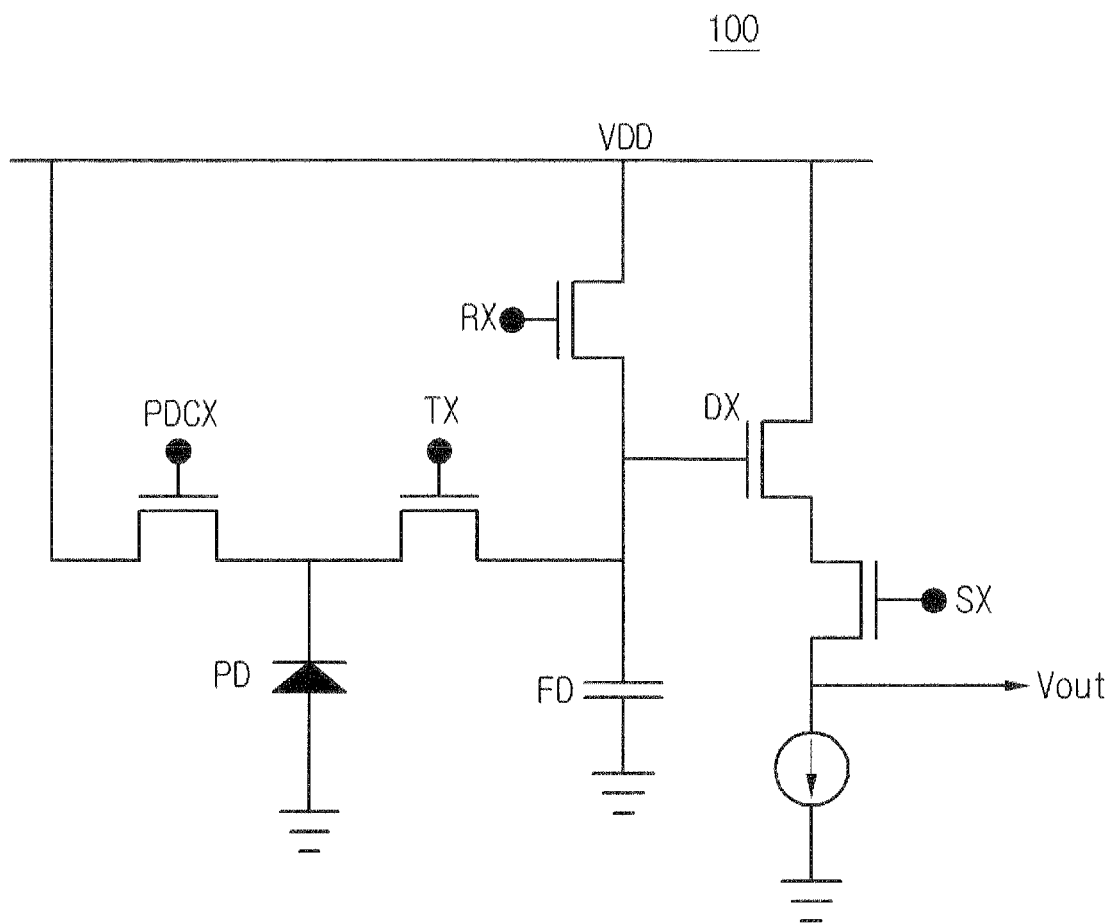
FIG. 1 is a circuit view of a pixel array according to the first embodiment.

In the description of the embodiments, it will be understood that, when a layer (or film), a region, a pattern, or a structure is referred to as being "on" or "under" another substrate, another layer (or film), another region, another pad, or another pattern, it can be "directly" or "indirectly" on the other substrate, layer (or film), region, pad, or pattern, or one or more intervening layers may also be present. Such a position of the layer has been described with reference to the drawings.

The thickness and size of each layer shown in the drawings may be exaggerated, omitted or schematically drawn for the purpose of convenience or clarity. In addition, the size of elements does not utterly reflect an actual size.

FIG. 1 is a circuit view of a pixel array 100 according to the first embodiment.

A pixel, a pixel array and an image sensor including the pixel array according to the first embodiment may include a photo-electro conversion unit, a capacitor for storing charges converted by the photo-electro conversion unit, an output switching device for outputting the electric potential of the capacitor, and a removal unit for removing a part of charges converted by the photo-electro conversion unit.

The embodiment is applicable for a WDR (wide dynamic range) pixel, a pixel array and an image sensor including the pixel array, but the embodiment is not limited thereto.

The photo-electro conversion unit may include a photodiode (PD), the capacitor may include a floating diffusion region (FD), and the output switching device may include a drive transistor DX, but the embodiment is not limited thereto.

The removal unit may include a removal switching device for discharging the charges of the photo-electro conversion unit to a power supply line (VDD). For instance, the removal unit may include a photodiode control transistor (PDCX) for discharging the charges of the photo-electro conversion unit to the power supply line (VDD), but the embodiment is not limited thereto.

According to the embodiment, the pixel array may further include a transfer switching device for transferring the charges converted by the photo-electro conversion unit to the capacitor and a reset switching device connected to the power supply line to reset the electric potential of the capacitor. The transfer switching device may include a transfer transistor TX and the reset switching device may include a reset transistor RX, but the embodiment is not limited thereto.

According to the embodiment, the removal unit is provided at one side of the photo-electro conversion unit and the transfer switching device is provided at the other side of the photo-electro conversion unit. The transfer switching device is disposed between the photo-electro conversion unit and the capacitor and the output switching device can be electrically connected between the transfer switching device and the reset switching device, but the embodiment is not limited thereto.

For instance, the pixel, the pixel array and the image sensor including the pixel array according to the embodiment may include the photodiode PD, the transfer transistor TX provided at one side of the photodiode PD, a reset transistor RX provided at one side of the transfer transistor TX, a drive transistor DX, a select transistor SX, and a photodiode control transistor PDCX provided at the other side of the photodiode PD.

The operational voltage of the removal switching device, for instance, the gate operational voltage of the photodiode control transistor PDCX may be present in the range between the high voltage Von and the low voltage Voff corresponding to the on/off operation. In detail, the photodiode control transistor PDCX may have at least two operational voltages, such as a first voltage V1 and a second voltage V2 present in the range between the high voltage Von and the low voltage Voff, but the embodiment is not limited thereto.

Thus, the removal switching device, for instance, the photodiode control transistor PDCX can discharge a part of the charges to the power supply line as a voltage is applied thereto after a predetermined exposure time has elapsed.

In detail, the photodiode control transistor PDCX may have the gate operational voltage except for the high voltage Von and the low voltage Voff corresponding to the on/off operation of the photodiode control transistor PDCX as well as the gate operational voltage present in the range between the high voltage Von and the low voltage Voff. In addition, the voltages are additionally applied to the photodiode control transistor PDCX after the predetermined exposure time has elapsed, so that the charges generated from the photodiode can be discharged to the power supply line VDD.

The embodiment can provide the pixel, the pixel array, the image sensor including the pixel array and the method for operating the image sensor, in which the photodiode control transistor for controlling the quantity of the charges generated from the photodiode PD according to the intensity variation of the light is added to the 4-Tr structure used as the pixel structure for realizing the WDR and the gate voltage of the photodiode control transistor is adjusted, so that the high fill factor can be maintained without using an additional memory block for combining the images and the photodiode control transistor can be driven independently from the transistors used to drive the pixel.

Therefore, the embodiment can provide the pixel capable of improving the sensitivity while maintaining the high fill factor, the pixel array, the image sensor including the pixel array and the method for operating the image sensor.

Figure 2:
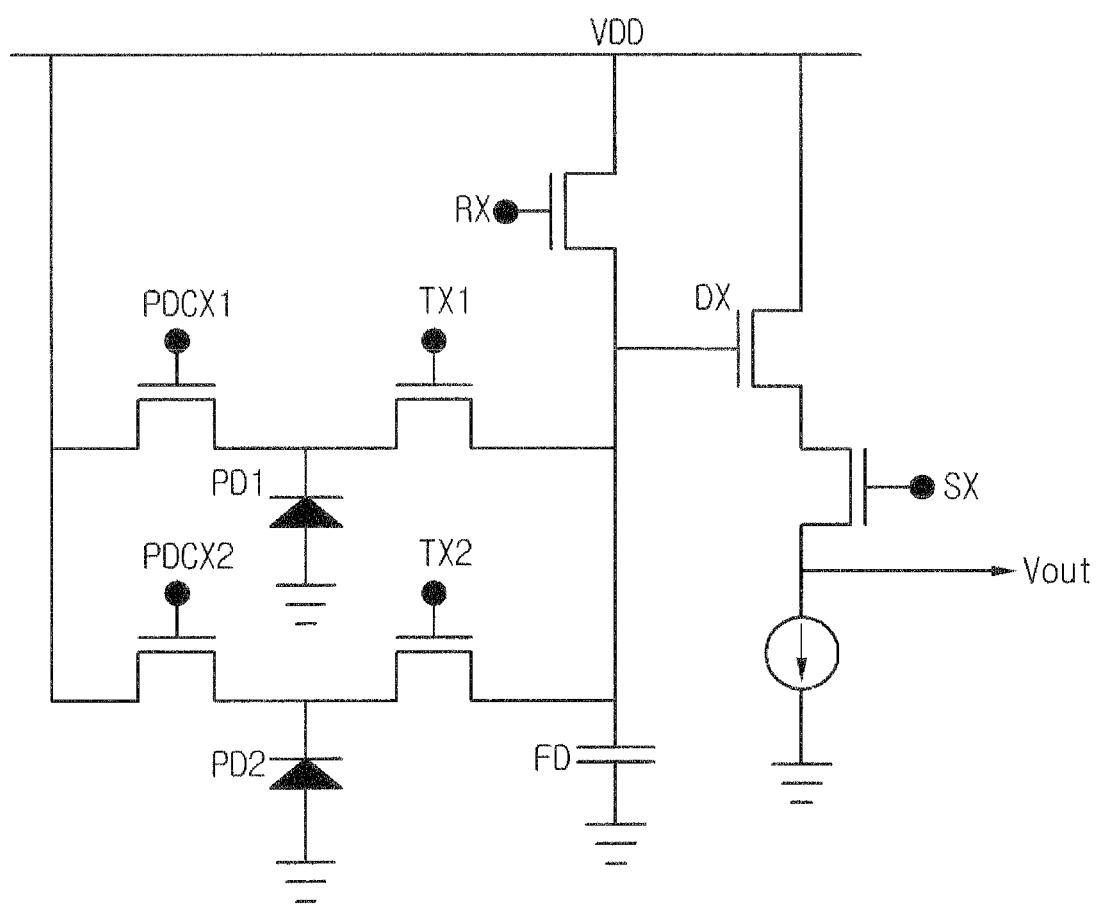
FIG. 2 is a circuit view of a pixel array according to the second embodiment.

FIG. 2 is a circuit view of a pixel array 200 according to the second embodiment.

A pixel, a pixel array and an image sensor including the pixel array according to the second embodiment may include first and second photo-electro conversion units, a capacitor for storing charges converted by the first and second photo-electro conversion units, an output switching device connected to a power supply line to output the electric potential of the capacitor, a first removal unit for discharging a part of charges converted by the first photo-electro conversion unit to the power supply line, and a second removal unit for discharging a part of charges converted by the second photo-electro conversion unit to the power supply line.

The first and second removal units may include first and second removal switching devices for discharging the charges of the first and second photo-electro conversion units to the power supply line VDD. For instance, the first and second removal units may include first and second photodiode control transistors PDCX1 and PDCX2 for discharging the charges of the first and second photo-electro conversion units to the power supply line VDD, but the embodiment is not limited thereto.

The photo-electro conversion units may include a photodiode (PD), the capacitor may include a floating diffusion region (FD), and the output switching device may include a drive transistor DX.

In addition, according to the embodiment, the pixel array may include first and second transfer switching devices for transferring the charges converted by the first and second photo-electro conversion units to the capacitor and a reset switching device connected to the power supply line to reset the electric potential of the capacitor.

For instance, the pixel, the pixel array and the image sensor including the pixel array according to the second embodiment may include a first photodiode PD1, a first transfer transistor TX1 provided at one side of the first photodiode PD1, a first photodiode control transistor PDCX1 provided at the other side of the first photodiode PD1, a second photodiode PD2 provided in the pixel having the first photodiode PD1, a second transfer transistor TX2 provided at one side of the second photodiode PD2, a second photodiode control transistor PDCX2 provided at the other side of the second photodiode PD2, a reset transistor RX provided at the other side of the first and second transfer transistors TX1 and TX2, a drive transistor DX, and a select transistor SX.

According to the second embodiment, the first and second photo-electron conversion units, that is, the first and second photodiodes PD1 and PD2 may be shared in one pixel.

Thus, the capacitor provided at one side of the first and second transistors TX1 and TX2 may be shared, that is, the floating diffusion region FD may be shared.

According to the second embodiment, at least four shared photo-electro conversion units may be present in one pixel. In this case, the number of the removal units and the transfer switching devices may correspond to the number of shared photo-electro conversion units and one reset switching device and one output switching device are connected to the power supply line.

In detail, according to the second embodiment, shared photodiodes are present in one pixel and the number of the photodiode control transistors and the transfer transistors is the same as the number of shared photodiodes. Other transistors are provided one by one.

For instance, if at least four shared photodiodes are present in one pixel, the number of the photodiode control transistors and the transfer transistors may correspond to the number of shared photodiodes and the remaining transistors, such as the reset transistor RX, the drive transistor DX and the select transistor SX, are provided one by one.

According to the second embodiment, the gate operational voltage of the first and second photodiode control transistor PDCX1 and PDCX2 may be present in the range between the high voltage Von and the low voltage Voff corresponding to the on/off operation. In detail, the first and second photodiode control transistor PDCX1 and PDCX2 may have at least two operational voltages, such as a first voltage V1 (see, FIG. 3) and a second voltage V2 (see, FIG. 3) present in the range between the high voltage Von and the low voltage Voff, but the embodiment is not limited thereto.

In detail, the first and second photodiode control transistor PDCX1 and PDCX2 may have the gate operational voltage except for the high voltage Von and the low voltage Voff corresponding to the on/off operation of the first and second photodiode control transistor PDCX1 and PDCX2 as well as the gate operational voltage present in the range between the high voltage Von and the low voltage Voff. In addition, the voltages are additionally applied to the first and second photodiode control transistor PDCX1 and PDCX2 after the predetermined exposure time has elapsed, so that the charges generated from the photodiode can be discharged to the power supply line VDD.

The embodiment can provide the pixel, the pixel array, the image sensor including the pixel array and the method for operating the image sensor, in which the photodiode control transistors for controlling the quantity of the charges generated from the photodiodes PD according to the intensity variation of the light are added to the 4-Tr structure used as the pixel structure for realizing the WDR and the gate voltage of the photodiode control transistors is freely adjusted, so that the high fill factor can be maintained without using an additional memory block for combining the images and the photodiode control transistors can be driven independently from the transistors used to drive the pixel.

Therefore, the embodiment can provide the pixel capable of improving the sensitivity while maintaining the high fill factor, the pixel array, the image sensor including the pixel array and the method for operating the image sensor.

Figure 3:
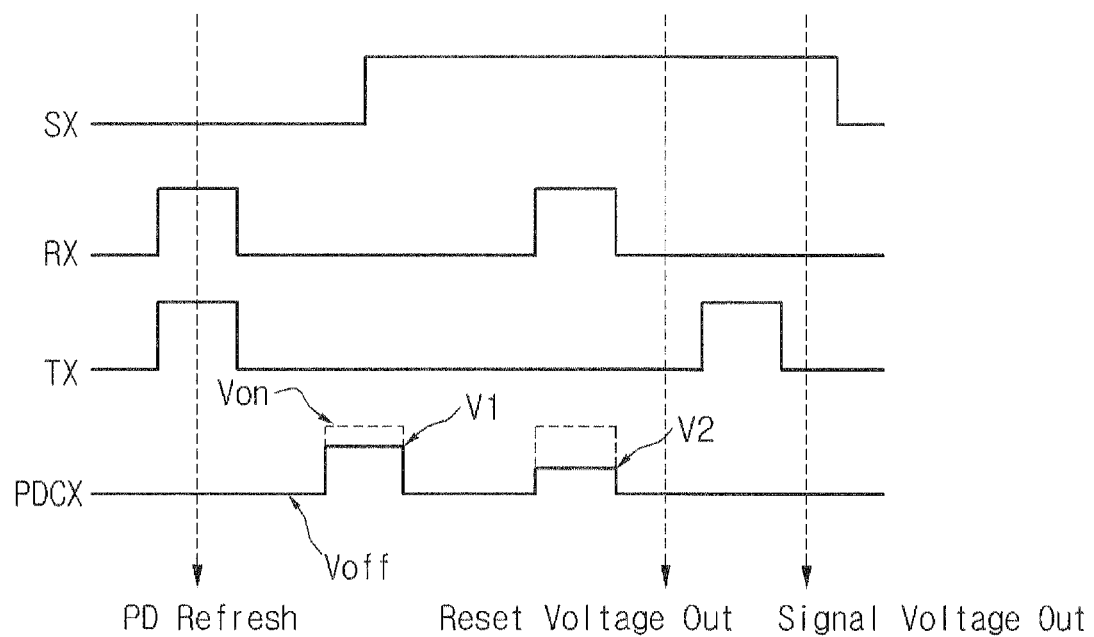
FIG. 3 is a timing diagram obtained from a circuit of a pixel array according to the embodiment.
Figure 4:
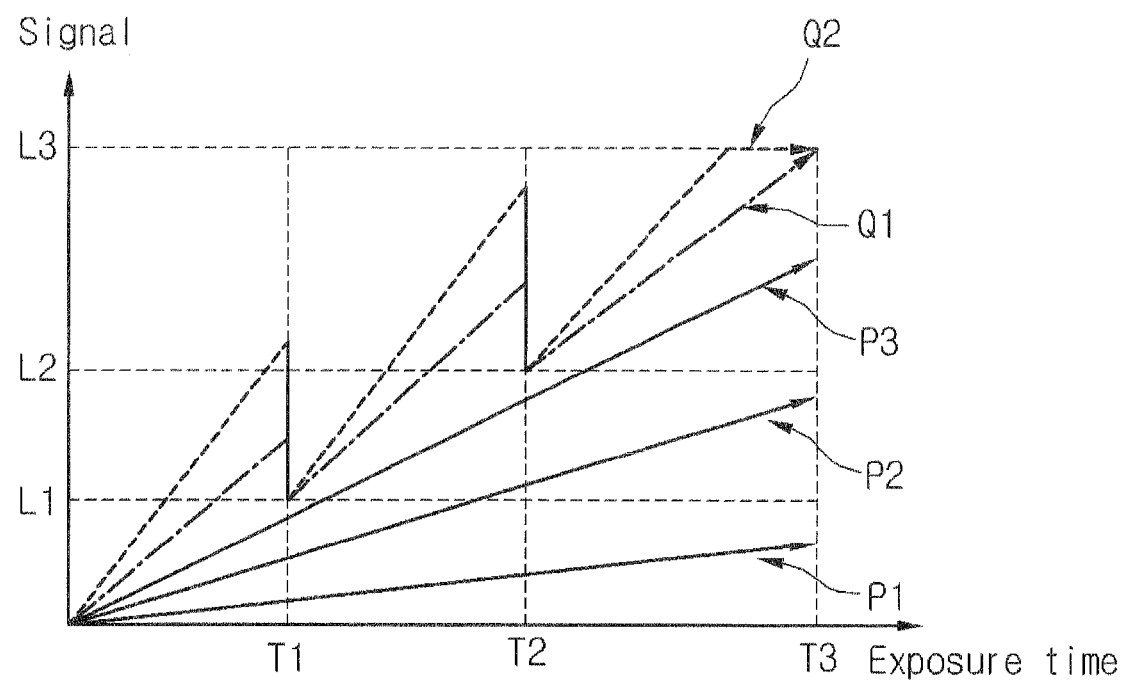
FIG. 4 is a graph showing the variation of charges as a function of exposure time of a photodiode and voltages applied to two different photodiode control transistors in a pixel array according to the embodiment.

FIG. 3 is a timing diagram obtained from a circuit of a pixel array according to the embodiment, and FIG. 4 is a graph showing the variation of charges as a function of exposure time of a photodiode and voltages applied to two different photodiode control transistors in a pixel array according to the embodiment.

Hereinafter, the method for operating the pixel array according to the embodiment will be described with reference to FIGS. 3 and 4.

According to the method for operating the pixel array and the image sensor of the embodiment, the pixel array includes the photo-electro conversion unit, the capacitor for storing the charges converted by the photo-electro conversion unit, and the output switching device for outputting the electric potential of the capacitor, in which a part of the charges converted by the photo-electro conversion unit is discharged to the power supply line VDD according to the exposure time to the light through the removal unit capable of removing the part of the charges converted by the photo-electro conversion unit.

For instance, the pixel, the pixel array, and the image sensor according to the embodiment include the photodiode PD and the photodiode control transistor PDCX provided at the other side of the photodiode PD, so that the charges generated from the photodiode PD according to the exposure time of the photodiode PD can be partially discharged to the power supply line VDD.

In detail, if the operational voltage in the range between the low voltage Voff and the high voltage Von is applied to the photodiode control transistor PDCX, the charges generated from the photodiode PD according to the exposure time of the photodiode PD can be partially discharged to the power supply line VDD.

The operational voltage may have various voltage levels, so the quantity of charges discharged to the power supply line VDD may be changed.

According to the embodiment, the operational voltage is predetermined to inhibit the charges from being completely saturated by the photodiode PD even if the light has the high intensity.

After a predetermined time has elapsed, the pixel, the pixel array, and the image sensor according to the embodiment may turn on/off the reset transistor RX to reset the floating diffusion region FD before the transfer transistor TX is turned on.

Hereinafter, the method for operating the pixel, the pixel array and the image sensor as a function of time according to the embodiment will be described with reference to FIGS. 3 and 4.

First, if the reset transistor RX is turned on, the electric potential of the floating diffusion region FD becomes the supply voltage VDD and the transfer transistor TX is turned on, so that the photodiode PD, which is a light receiving section, is reset.

Then, the transfer transistor TX is turned off and the light is incident into the photodiode PD. Thus, the charges are generated from the photodiode PD proportionally to the exposure time of the photodiode PD to the light.

Referring to FIG. 4, the exposure time is divided into three stages, but the embodiment is not limited thereto. For instance, the exposure time can be divided into a first exposure time T1, a second exposure time T2 and a third exposure time T3, but the embodiment is not limited thereto.

In addition, according to the embodiment, the reference charge level may be established according to each exposure time.

For instance, a first level L1 may be established for the first exposure time T1, a second level L2 may be established for the second exposure time T2, and a third level L3 may be established for the third exposure time T3.

According to the embodiment, the charges generated according to the exposure time can be discharged to the power supply line VDD by applying the operational voltage in the range between the low voltage Voff and the high voltage Von to the photodiode control transistor PDCX.

For instance, the charges exceeding the first level L1 based on the first exposure time T1 can be discharged to the power supply line VDD. In the same way, the charges exceeding the second level L2 based on the second exposure time T2 can be discharged to the power supply line VDD, but the embodiment is not limited thereto.

According to the embodiment, the operational voltages V1 and V2 applied to the photodiode control transistor PDCX may have the levels different from each other, so the quantity of the charges discharged to the power supply line VDD may be changed.

The operational voltages V1 and V2 applied to the photodiode control transistor PDCX are predetermined to inhibit the charges from being completely saturated by the photodiode PD even if the light has the high intensity.

Then, after a predetermined time has elapsed, the reset transistor RX is turned on/off to reset the floating diffusion region FD before the transfer transistor TX is turned on.

After that, as the transfer transistor TX is turned on, the charges are transferred to the floating diffusion region FD and the electric potential of the floating diffusion region FD is converted proportionally to the quantity of the charges, so that the data are output to the column through the select transistor SX.

According to the embodiment, if the light has the low intensity (P1, P2 and P3), all charges can be collected regardless of the operational voltage of the photodiode control transistor PDCX.

Meanwhile, if the charge saturation occurs due to the high intensity of the light, for example, if there are charges exceeding the reference levels L1 and L2 for the exposure time T1 and T2, the operational voltage is applied to the photodiode control transistor PDCX, so that the charges are partially discharged and the remaining charges are collected and output.

For instance, according to the embodiment, the charge having the high intensity of illumination, that is, the charge having the code of 500 to 1000 can be converted into the charge having the code of 200 to 250.

Thus, according to the embodiment, since the charge having the code of 500 to 1000 can be converted into the charge having the code of 200 to 250, the charges may not be saturated, but distinguished from each other.

According to the embodiment, a charge removal unit, such as a removal transistor Tr, which is a removal switching device operated independently from a 4-Tr structure used as a pixel structure for realizing the WDR, is added to the 4-Tr structure in order to adjust the quantity of charges generated from a photo-electro conversion unit, such as a photodiode (PD), according to the intensity variation of the light, and a gate voltage of the removal transistor Tr is freely adjusted so that the high fill factor can be maintained without using an additional memory block for combining the images.

Therefore, the embodiment can provide the pixel capable of improving the sensitivity while maintaining the high fill factor, the pixel array, the image sensor including the same and the method for operating the image sensor.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A pixel comprising:
a photo-electro conversion unit; a capacitor for storing charges converted by the photo-electro conversion unit; an output switching device for outputting an electric potential of the capacitor; and
a removal switching device for removing a part of the charges converted by the photo-electro conversion unit,
wherein the removal switching device is configured to discharge the charges of the photo-electro conversion unit to a power supply line, and
wherein the removal switching device has a gate operational voltage in a range between a high voltage and a low voltage corresponding to an on/off operation of the removal switching device.

2. The pixel of claim 1, further comprising:
a transfer switching device to transfer the charges converted by the photo-electro conversion unit to the capacitor; and
a reset switching device connected to the power supply line to reset the electric potential of the capacitor,
wherein the removal switching device and the transfer switching device are provided at one side and an opposite side of the photo-electro conversion unit, respectively,
the transfer switching device is disposed between the photo-electro conversion unit and the capacitor, and
the output switching device is electrically connected between the transfer switching device and the reset switching device.

3. The pixel of claim 1, wherein the removal switching device discharges a part of the charges to the power supply line as a voltage is applied thereto after a specific exposure time has elapsed.

4. A pixel comprising:
a first photo-electro conversion unit; a second photo-electro conversion unit;
a capacitor for storing charges converted by the first and second photo-electro conversion units;
an output switching device connected to a power supply line to output an electric potential of the capacitor;
a first removal unit for discharging a part of the charges converted by the first photo-electro conversion unit to the power supply line; and
a second removal unit for discharging a part of the charges converted by the second photo-electro conversion unit to the power supply line.

5. The pixel of claim 4, wherein the first and second photo-electro conversion units are shared in one pixel.

6. The pixel of claim 4, wherein the capacitor is a floating diffusion region shared in one pixel.

7. The pixel of claim 4, further comprising:
first and second transfer switching devices to transfer the charges converted by the first and second photo-electro conversion units to the capacitor; and
a reset switching device connected to the power supply line to reset the electric potential of the capacitor,
wherein at least four photo-electro conversion units are shared in one pixel, a number of removal units and the transfer switching devices corresponds to a number of shared photo-electro conversion units, and one reset switching device and one output switching device are connected to the power supply line.

8. The pixel of claim 4, wherein the first and second removal units include first and second removal switching devices to discharge the charges of the first and second photo-electro conversion units to the power supply line, and the first and second removal switching devices have an additional gate operational voltage in a range between a high voltage and a low voltage corresponding to an on/off operation of the first and second removal switching devices.

9. The pixel of claim 8, wherein the first and second removal switching devices discharge a part of the charges to the power supply line as a voltage is applied thereto after a specific exposure time has elapsed.

10. A pixel array including the pixel claimed in claim 1.

11. An image sensor including the pixel array of claim 10.

* * * * *